United States Patent [19]

Dunbar

[11] Patent Number: 5,273,384
[45] Date of Patent: Dec. 28, 1993

[54] THREAD PROTECTING DEVICE

[76] Inventor: Max E. Dunbar, 112 N. Cherry St., Lamoni, Iowa 50140

[21] Appl. No.: 949,795

[22] Filed: Sep. 22, 1992

[51] Int. Cl.$^5$ .................................... F16B 37/00
[52] U.S. Cl. .............................. 411/428; 411/174; 411/429; 411/970
[58] Field of Search ............. 411/427, 174, 175, 428, 411/112, 374, 376, 372, 371, 373, 375, 523, 524, 111, 433, 431, 430, 429, 920

[56] References Cited

U.S. PATENT DOCUMENTS

| | | | |
|---|---|---|---|
| 535,274 | 3/1895 | Clark | 411/429 X |
| 972,140 | 10/1910 | Adam | |
| 1,253,573 | 1/1918 | Burke | |
| 1,262,743 | 4/1918 | Bronson | 411/429 X |
| 1,324,867 | 12/1919 | Wilson | |
| 1,456,962 | 8/1921 | Baker | |
| 1,500,849 | 5/1922 | Rudolph | |
| 1,630,584 | 2/1926 | Schneider | |
| 2,456,234 | 6/1945 | Young | 285/130 |
| 2,663,213 | 10/1950 | Davidson | |
| 3,210,117 | 10/1963 | Hall | 296/37.2 |
| 3,496,980 | 2/1970 | Steward et al. | 411/112 |
| 3,747,814 | 7/1973 | Briery | 224/42.12 |
| 4,375,933 | 3/1983 | Hassler et al. | 411/112 |
| 4,400,123 | 8/1983 | Dunegan | 411/373 |
| 4,775,272 | 10/1988 | Toth | 411/429 |
| 4,919,394 | 4/1990 | Otte et al. | 411/174 X |

FOREIGN PATENT DOCUMENTS

| | | | |
|---|---|---|---|
| 291597 | 4/1916 | Fed. Rep. of Germany | 411/427 |
| 3301527A1 | 1/1983 | Fed. Rep. of Germany | |
| 115906 | 12/1968 | Norway | 411/429 |
| 312979 | 8/1971 | U.S.S.R. | 411/531 |
| 724813 | 3/1980 | U.S.S.R. | 411/429 |
| 139917 | 3/1920 | United Kingdom | |
| 318997 | 5/1930 | United Kingdom | 411/428 |

Primary Examiner—Rodney M. Lindsey
Attorney, Agent, or Firm—Zarley, McKee, Thomte, Voorhees & Sease

[57] ABSTRACT

The thread protecting device of the present invention includes a U-shaped clip with a hollow cylindrical cap mounted thereon. The clip includes spaced apart upper and lower legs defining a channel therebetween for receipt of a portion of a vehicle frame. The cap includes a threaded plug in the lower end thereof and a closed upper end. A carrier bolt for a spare tire carrier is adapted to extend through a hole in the legs of the clip, an aperture in the frame, and the threaded lower end of the cap such that the threads are enclosed within the cap. A grease fitting is provided on the cap so that grease can be injected into the cap for lubricating the threads.

10 Claims, 1 Drawing Sheet

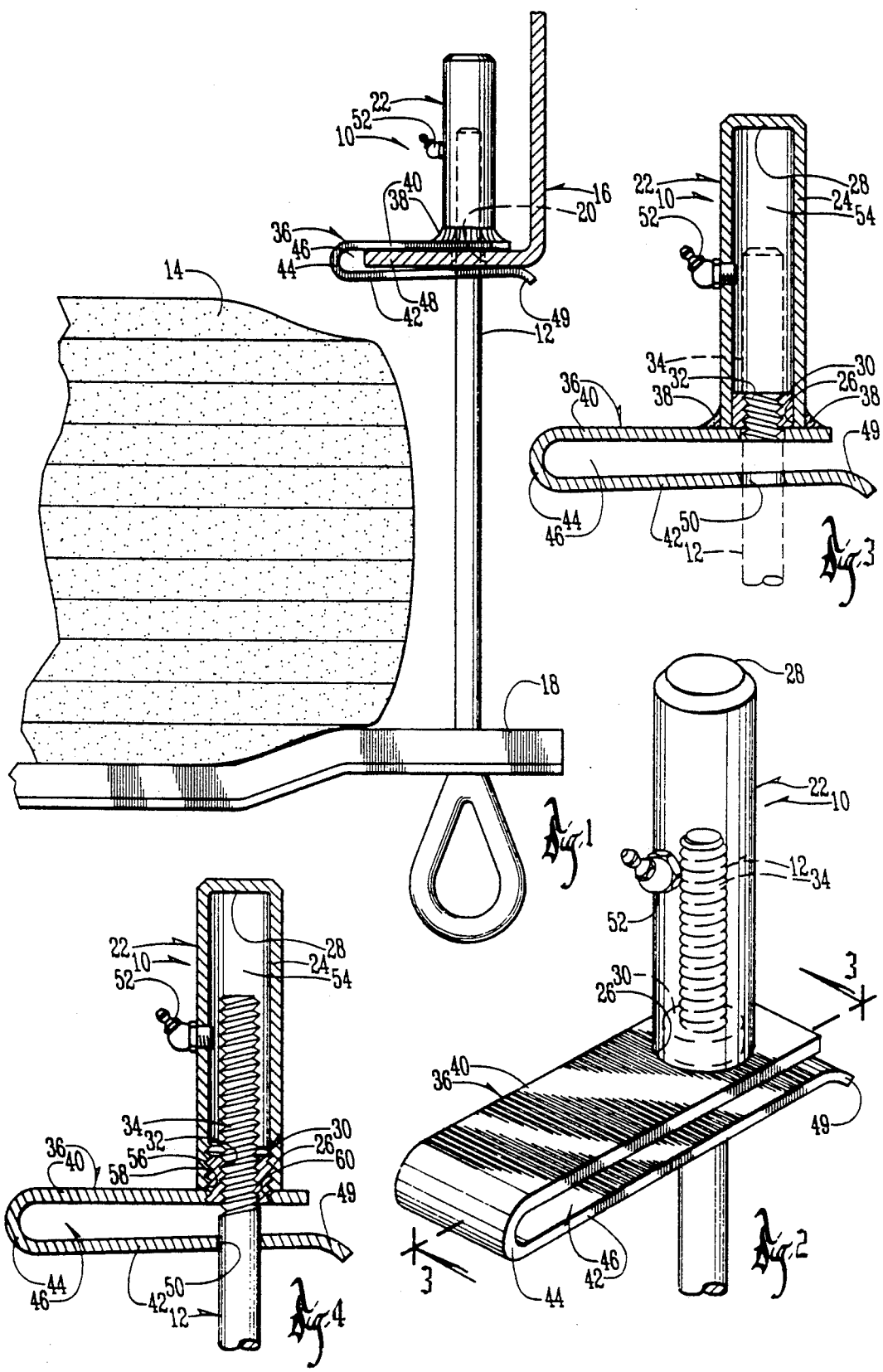

THREAD PROTECTING DEVICE

BACKGROUND OF THE INVENTION

Many types of road vehicles, particularly trucks and vans, have spare tires which are mounted beneath the frame. Typically, the spare tire is secured to the frame by one or more bolts which extend through the tire or a tire carrier and which is secured to the frame by a nut. With such under carriage mounting of the spare tire, the exposed threads on the bolt are subjected to water, dirt, rock chips, and numerous road hazards, all of which damage the threads, thereby making removal of the nut from the bolt difficult, if not impossible. If the bolt threads are excessively damaged or corroded, the bolt may need to be cut so that the spare tire can be used. Similar problems arise in other environments wherein the threads of the bolt are exposed.

For example, in Ford pickup trucks, the spare tire is mounted beneath the vehicle frame and is held in position by a sling. An elongated bolt extends upwardly through a portion of the sling and is bolted to the vehicle frame. After extended periods of driving, particularly in bad weather or on gravel roads, the exposed threads of the bolt are filled with dirt and/or corroded, thus making removal of the nut from the bolt very difficult.

Accordingly, a primary objective of the present invention is provision of an improved thread protecting device.

Another objective of the present invention is the provision of a thread protecting device which can be utilized on spare tire carrier bolts.

Another objective is the provision of a thread protecting device which can be used on vehicle spare tire carriers without modifying the vehicle or carrier.

A further objective of the present invention is the provision of a thread protecting device which is easy to install and remove.

A further objective is the provision of a thread protecting device having a clip for positioning the device on a vehicle frame.

Another objective of the present invention is the provision of a thread protecting device which is economical to manufacture, durable and safe in use, and is virtually maintenance free.

These and other objectives will become apparent from the following description of the invention.

SUMMARY OF THE INVENTION

A thread protecting device is provided for spare tire carrier bolt threads which are exposed to moisture, dirt, and other debris and damaging materials. The device includes a U-shaped clip having spaced apart upper and lower legs defining a channel there between. A web interconnects the opposite legs, and each leg has a hole therein adapted to align with a hole in the frame through which the bolt extends. A hollow cylindrical cap is mounted on the clip and is axially aligned with the holes in the legs. The cap has a closed upper end and an open lower end. An insert or plug having threads mating with the bolt threads is fixed in the lower end of the cap such that the bolt can be threaded into the cap, whereby the threads of the bolt are enclosed within the cap. A grease fitting is provided on the cap so that grease can be injected into the cap for lubricating the threads. The clip prevents the cap from rotating relative to the frame as the bolt is threaded into or out of the cap.

BRIEF DESCRIPTION OF THE PREFERRED EMBODIMENTS

FIG. 1 is a side elevation view of the thread protecting device of the present invention as used on a spare tire carrier bolt of a truck or other motor vehicle.

FIG. 2 is an enlarged perspective view of the thread protecting device.

FIG. 3 is a sectional view taken along lines 3—3 of FIG. 2.

FIG. 4 is a view similar to FIG. 3 showing a second embodiment of the thread protecting device.

DETAILED DESCRIPTION OF THE DRAWINGS

The thread protecting device of the present invention is generally designated in the drawings by the reference numeral 10. The device 10 is intended to replace a nut on conventional nut and bolt assemblies which leave the threads of the bolt exposed to moisture, dirt, debris and other damaging matter. For example, in FIG. 1, the device 10 is shown in use on a spare tire carrier bolt 12 of a motor vehicle, such as a pickup truck, wherein the spare tire 14 is carried below the vehicle frame or body member 16 by a sling 18. The sling 18 is secured to the frame 16 by the bolt 12 which extends through an aperture 20 in the frame 16.

The device 10 includes an elongated hollow cylindrical cap 22 having a sidewall 24, an open first end 26, and a closed second end 28. An insert or plug 30 is fixed within the cap 22 adjacent the first end 26 thereof. The plug 30 includes threads 32 which threadably receive the threads 34 of bolt 12. The plug 30 is press fit, welded or otherwise securely fixed into the open first end 26 of the cap 2. Alternatively, the plug 22 can be welded onto the first end of the cap.

The cap 22 is mounted upon a clip 36 by welds 38. The clip 36 includes an upper leg 40, a lower leg 42, and a web 44 interconnecting the legs 40, 42 so as to define a U-shaped member with a channel 46 between the legs 40, 42. The channel 46 is adapted to receive an end portion 48 of the frame 16. The upper leg 40 includes an outwardly flared end 49 so that clip 36 can be easily positioned on frame 16. It is understood that the flared end could be on either or both of legs 40, 42 so as to facilitate the mounting of device 10 on frame 16. A hole 50 is provided in each of the legs 40, 42, with the center holes 50 being axially aligned with the plug 30. The holes 50 are adapted to be aligned with the aperture 20 in the frame 16 when the clip 36 is mounted upon the frame.

A grease fitting 52 is provided on the sidewall 24 of the cap 22 so that grease can be injected into the cavity 54 defined by cap 22. The grease lubricates the threads of the plug 30 and of the bolt 12, so that the bolt can be easily turned or rotated into and out of the device 10. The clip 36 holds the device 10 against rotation relative to the frame 16 during rotation of the bolt 12 in either the clockwise or counterclockwise direction.

FIG. 4 shows an alternative embodiment of the device 10. In this alternative embodiment, all of the components are essentially the same as described above, except that plug 30 includes external threads 56 which are threadably received on internal threads 58 on the first end 26 of the cap 22, and which are threadably received in mating threads 60 on the hole 50 of the upper leg 40. Thus, the cap 22 and the clip 36 in the alternative embodiment can be assembled without welding. The remaining structure and function of the alternative embodiment is the same as described above with respect to the bolt 12.

When the device 10 is used upon the bolt 12, it is seen that the threads of the bolt 12 are protected from damage by moisture, dirt, rock chips or other material. Thus, the bolt 12 can be easily removed from device 10 and the frame 16 such that the spare tire 14 can be quickly and easily removed from the sling 18. The device 10 remains in position on the vehicle frame 16 when bolt 12 is removed. It is understood that device 10 can also be used in other environments, besides spare tire carrier bolts, wherein the threads of the bolt are exposed to damaging materials.

Preferably, the device 10 is made from galvanized steel. The clip 36 may be spring steel.

The invention has been shown and described above in connection with the preferred embodiment, and it is understood that many modifications, substitutions and additions may be made which are within the intended broad scope of the invention. From the foregoing, it can be seen that the present invention accomplishes at least all of the stated objectives.

What is claimed is:

1. A thread protecting device for covering and protecting threads on a spare tire carrier bolt, the bolt extending through an aperture on a vehicle frame, the device comprising:
   a U-shaped clip having spaced apart upper and lower legs defining a channel therebetween, a web interconnecting the legs, each leg having a hole therein, the clip being adapted to receive a portion of the frame between the legs aligning with the aperture in the frame;
   a hollow cylindrical cap mounted on the clip and being axially aligned with the holes in the legs, the cap having a closed upper end, an open lower end; and a sidewall extending between the upper and lower ends; and
   thread means including a plug mounted in the lower end of the cap for threadably receiving the bolt threads such that the threads of the bolt are enclosed within the cap for protection from water, dirt and other debris on a road surface.

2. The device of claim 1 further comprising a grease fitting mounted on the cap such that grease can be injected into the cap.

3. The device of claim 1 wherein at least one leg of the clip has an upwardly flared end opposite the web.

4. The device of claim 1 wherein the sidewall of the cap is spaced radially apart from the bolt threads.

5. The device of claim 1 wherein the plug includes external threads and the cap includes internal threads such that the plug is at least partially threadably received into the cap.

6. The device of claim 5 wherein the hole in the upper leg of clip includes threads for threadably receiving a portion of the plug.

7. The device of claim 1 wherein the cap is welded onto the clip.

8. The device of clip 1 wherein the thread means includes said plug threaded partially into the hole in the upper leg of the clip and threaded partially into the lower end of the cap such that the cap is securely mounted on the clip.

9. A thread protecting device comprising:
   enclosure means having a first open end, a second closed end, and a sidewall extending therebetween;
   plug means connected to the enclosure means at the first end and designed to threadably receive the bolt;
   mounting means coupled to the enclosure means for positioning the enclosure means on a body and substantially preventing rotation of the enclosure means relative to the bolt wherein the enclosure means is adapted to threadably receive the plug means.

10. The device of claim 9 wherein said mounting means comprises a U-shaped clip having spaced apart upper and lower legs defining a channel therebetween, a web interconnecting the legs, each leg having a hole therein, the clip being adapted to receive a portion of the body between the legs.

* * * * *